(12) United States Patent
Fujii et al.

(10) Patent No.: US 9,784,889 B2
(45) Date of Patent: Oct. 10, 2017

(54) ANTIREFLECTION STRUCTURE AND DISPLAY DEVICE

(71) Applicant: Sharp Kabushiki Kaisha, Osaka-shi, Osaka (JP)

(72) Inventors: Akiyoshi Fujii, Osaka (JP); Chiaki Minari, Osaka (JP); Tokio Taguchi, Osaka (JP); Nobuaki Yamada, Osaka (JP); Kiyoshi Minoura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 54 days.

(21) Appl. No.: 14/409,159

(22) PCT Filed: Jun. 14, 2013

(86) PCT No.: PCT/JP2013/066429
§ 371 (c)(1),
(2) Date: Dec. 18, 2014

(87) PCT Pub. No.: WO2013/191092
PCT Pub. Date: Dec. 27, 2013

(65) Prior Publication Data
US 2015/0177420 A1    Jun. 25, 2015

(30) Foreign Application Priority Data
Jun. 22, 2012   (JP) ................. 2012-141318

(51) Int. Cl.
*G02B 1/118*   (2015.01)
*G02B 1/04*   (2006.01)

(52) U.S. Cl.
CPC ............. *G02B 1/118* (2013.01); *G02B 1/04* (2013.01)

(58) Field of Classification Search
CPC . G02B 1/10; G02B 1/105; G02B 1/11; G02B 1/118; G02B 1/115; G02B 1/04;
(Continued)

(56) References Cited

U.S. PATENT DOCUMENTS

2007/0059490 A1   3/2007 Kaneko
2008/0129933 A1   6/2008 Nishida et al.
(Continued)

FOREIGN PATENT DOCUMENTS

JP    7-294706 A    11/1995
JP    2000-71290 A    3/2000
(Continued)

OTHER PUBLICATIONS

International Search Report PCT/ISA/210 for International Application No. PCT/JP2013/066429 dated Aug. 26, 2013.

*Primary Examiner* — Jie Lei
(74) *Attorney, Agent, or Firm* — Harness, Dickey & Pierce, P.L.C.

(57) ABSTRACT

An antireflection structure is disclosed which is capable of enhancing designability by adjusting a reflection characteristic of a Moth-eye structure. A display device using the antireflection structure is also disclosed. The antireflection structure according to an embodiment includes a resin base member including, on a surface, an uneven structure in which a height from a bottom part to a top part is equal to or smaller than a visible light wavelength, and a resin layer covering at least a part of the uneven structure, the resin layer covering the bottom part of the uneven structure more thickly than the top part of the uneven structure.

15 Claims, 10 Drawing Sheets

(58) Field of Classification Search
CPC . G02B 5/04; G02B 5/045; G02B 5/28; G02B 5/285; G02B 5/0278; G02B 26/00; G02B 26/0875; G02B 26/0883; G02B 27/0018; B60R 1/088; B60R 1/085; H04N 5/65; G02F 1/133504; G02F 1/133502
USPC ....... 359/580, 581, 586, 587, 599, 601, 604, 359/605, 609; 349/112, 137
See application file for complete search history.

(56) References Cited

U.S. PATENT DOCUMENTS

| | | | | |
|---|---|---|---|---|
| 2009/0190225 A1* | 7/2009 | Yamada | ................ | G02B 1/105 359/580 |
| 2010/0167019 A1 | 7/2010 | Ohyanagi et al. | | |
| 2011/0003121 A1 | 1/2011 | Tsuda | | |
| 2011/0310489 A1 | 12/2011 | Kajiya et al. | | |
| 2012/0062995 A1 | 3/2012 | Momoki | | |
| 2012/0081909 A1 | 4/2012 | Nishida et al. | | |
| 2012/0147472 A1 | 6/2012 | Kajiya et al. | | |
| 2012/0160560 A1 | 6/2012 | Kajiya et al. | | |

FOREIGN PATENT DOCUMENTS

| | | |
|---|---|---|
| JP | 2003-172808 A | 6/2003 |
| JP | 2007-76242 A | 3/2007 |
| JP | 2007-187868 A | 7/2007 |
| JP | 2008-165212 A | 7/2008 |
| JP | 2010-44184 A | 2/2010 |
| JP | 2010-228443 A | 10/2010 |
| JP | 2011-138059 A | 7/2011 |
| JP | 2011-154338 A | 8/2011 |
| JP | 2011-167924 A | 9/2011 |
| JP | 2012-63393 A | 3/2012 |
| JP | 2013-41027 A | 2/2013 |
| WO | WO-2009/144970 A1 | 12/2009 |

* cited by examiner

Without resin layer    With resin layer

Without resin layer    With resin layer (a)

(b)

(c)

(d)

Without resin layer

With resin layer

Without resin layer

With resin layer

ANTIREFLECTION STRUCTURE AND DISPLAY DEVICE

TECHNICAL FIELD

The present invention relates to an antireflection structure and a display device. More specifically, the present invention relates to an antireflection structure for reducing a surface reflectance by an uneven structure provided on a surface and a display device having the surface reflectance reduced by using the antireflection structure.

BACKGROUND ART

As a technique for reducing surface reflection, there is conventionally known a light interference film configured by stacking layers having different refractive indices. In recent years, studies related to an uneven structure having a smaller size than a visible light wavelength, that is, a so-called Moth-eye structure have been advanced as a technique capable of remarkably reducing surface reflection as compared with the light interference film.

The Moth-eye structure is an uneven structure which is much finer than an uneven structure formed on an antiglare (AG) film and has a smaller size than a visible light wavelength. According to the Moth-eye structure, a change in a refractive index can be artificially continuous in a boundary between an outside (air) and an article which are media having different refractive indices from each other. For this reason, it is possible to suppress reflection of light generally occurring in a boundary between the media having the different refractive indices from each other. By disposing the Moth-eye structure on a surface of an article which is to be subjected to antireflection processing, accordingly, it is possible to considerably suppress the reflection of the light on the surface of the article, thereby enhancing a transmissivity of light remarkably.

The Moth-eye structure is extremely effective as means for enhancing visibility of a display device. When the display device is to be utilized in a bright place, particularly, a large quantity of outside light is incident on an outermost surface of the display device. For this reason, a surface reflectance should be reduced sufficiently. Otherwise, a ratio of a quantity of reflected light to a quantity of displaying light emitted from an inner part of the display device is excessively increased so that clear display cannot be obtained. By utilizing the Moth-eye structure, it is possible to sufficiently reduce the surface reflectance on the outermost surface of the display device. Therefore, it is possible to prevent decrease in a contrast ratio of display images in the bright place.

Examples of a method of disposing the Moth-eye structure on the outermost surface of the display device include a method of attaching an antireflection film including the Moth-eye structure on a surface to a surface of an article which is to be subjected to antireflection processing. As a method of manufacturing the antireflection film including the Moth-eye structure on the surface, there is known a method of pushing a mold including, on a surface, a structure obtained by inverting the Moth-eye structure against a surface of a base film and transferring the inverted structure formed on the surface of the mold onto the surface of the base film. As a method of forming the inverted structure on the surface of the mold, moreover, there is known a method of anodizing a surface of a mold to form an oxide film, thereby etching the oxide film selectively.

The Moth-eye structure is disposed on the outermost surface of the display device in many cases. In recent years, many display devices include touch panels. For this reason, the Moth-eye structure is required to also have characteristics, for example, a mechanical strength and a contamination resistance. On the other hand, it is considered to provide a covering layer on the surface of the Moth-eye structure. For example, Patent Literature 1 describes a covering layer consisting of a hydrolytic condensation product of a silane coupling agent. Patent Literature 2 describes a transparent thin film such as silicon dioxide and a layer which has a film thickness of several nm or less and is excellent in an oil repelling property (see paragraph 0045). Patent Literature 3 describes a film having low surface energy such as a water repellent coating film made of polytetrafluoroethylene in a film thickness of 100 Å to 10000 Å (see claims 2 and 3, and paragraphs 0036 and 0037). Patent Literature 4 describes an antifouling function layer consisting of a material containing fluorine and formed with an uneven structure maintained (see claim 8, paragraph 0114). Patent Literature 5 describes resin coating having a greater contact angle with water than 90° and the resin coating having a smaller contact angle with water than 90° (see claims 6 and 7). Patent Literature 6 describes a functional layer formed by directly chemical bond of a compound containing silicon to a surface of a fine protrusion. Patent Literature 7 describes a transparent conductive film taking a shape conforming to a shape of a structure and having a film thickness of 9 to 50 nm (see claim 1, and paragraphs 0020 and 0021). Patent Literature 8 describes a transparent conductive film having the greatest average film thickness in a top part of a structure (see claim 5). Patent Literature 9 describes a transparent conductive thin film and an opaque thin film (see claims 1 and 6).

However, a conventional coating layer provided on the surface of the Moth-eye structure is formed in a uniform thickness or in an extremely small film thickness on the surface of the Moth-eye structure so as not to vary a reflectance characteristic of the Moth-eye structure.

CITATION LIST

Patent Literature

Patent Literature 1: JP 2010-44184 A
Patent Literature 2: JP 2000-71290 A
Patent Literature 3: JP 2003-172808 A
Patent Literature 4: JP 2007-76242 A
Patent Literature 5: JP 2007-187868 A
Patent Literature 6: JP 2010-228443 A
Patent Literature 7: JP 2011-138059 A
Patent Literature 8: JP 2011-154338 A
Patent Literature 9: JP 2011-167924 A

SUMMARY OF INVENTION

Technical Problem

As described above, it is possible to remarkably reduce the surface reflectance of a product by disposing the Moth-eye structure. Therefore, it is possible to implement a product which is excellent in visibility. For example, it is possible to clearly recognize a display image of a display device also in a bright outdoor environment and to prevent an illumination device from being reflected on a screen in a room.

In order to satisfy various needs in product development, however, there was some room for improvement in designability of a product by adjusting the reflection characteristic of the Moth-eye structure. There was no prior art which considers the Moth-eye structure from this viewpoint.

In view of the above state of the art, it is an object of the present invention to provide an antireflection structure capable of enhancing designability by adjusting the reflection characteristic of the Moth-eye structure and a display device using the antireflection structure.

Solution to Problem

The present inventors made earnest investigations into the design of the Moth-eye structure and found that it is possible to enhance the designability of a product by adjusting design conditions of the Moth-eye structure. In other words, the design conditions of the Moth-eye structure directly influence an outer appearance of the product. For example, when a height of the Moth-eye structure is changed, the reflection characteristic is varied so that a reflection color is seen to be changed with human eyes. Therefore, the present inventors have noted that it is possible to regulate a color tone of the outer appearance of the product or to give a decorative design to the outer appearance of the product by adjusting the reflection color of the Moth-eye structure.

On the other hand, there is limited a method capable of efficiently forming the Moth-eye structure to be a very fine structure. A method of forming the Moth-eye structure serving as an industrially useful method includes a method of transferring the Moth-eye structure to a base film by using a mold including an inversion structure of the Moth-eye structure on a surface. Referring to this method, however, a surface structure of a film to be manufactured is uniquely determined depending on a surface structure of a mold to be used. For this reason, it is necessary to correspondingly manufacture another mold in order to form Moth-eye structures having different heights, for example. Also in the case in which Moth-eye structures of two types or more are to be disposed in the film, furthermore, a mold including inversion structures of the Moth-eye structures of two types or more is manufactured with a degree of difficulty increased considerably as compared with manufacture of a mold including an inversion structure of a single type.

Therefore, the present inventors made investigations into a method of forming various Moth-eye structures from a single mold including a specific surface structure in order to enable Moth-eye structures having different reflection colors to be created separately without manufacturing plural types of molds. As a result, they arrived at a method of forming a resin layer on a base member including the Moth-eye structure and adjusting a thickness of the resin layer to regulate the height of the Moth-eye structure. More specifically, if the thickness of the resin layer is increased in a depression portion of the base member including the Moth-eye structure, it is possible to decrease the height of the Moth-eye structure present on the surface of the antireflection structure. Consequently, reflection in a red region of visible light is increased through wavelength dispersion of the Moth-eye structure so that a slightly reddish tinge as compared with the case in which the height of the Moth-eye structure is great appears.

As described above, the present inventors resulted in the fact that the problem can be solved completely. These findings have now led to completion of the present invention.

In other words, an aspect of the present invention is an antireflection structure including a resin base member including, on a surface, an uneven structure in which a height from a bottom part to a top part is equal to or smaller than a visible light wavelength and a resin layer covering at least a part of the uneven structure, wherein the resin layer covers the bottom part of the uneven structure more thickly than the top part of the uneven structure.

The present invention will be described below in detail.

Referring to the antireflection structure, the resin layer covering a part or whole of the uneven structure formed on the surface of the resin base member changes the height from the bottom part to the top part in the uneven structure, that is, a difference in height of the uneven structure. More specifically, the resin layer covers the bottom part of the uneven structure more thickly than the top part of the uneven structure. As a result, the difference in height of an uneven structure formed on a surface of the antireflection structure is smaller than that of the uneven structure formed on the surface of the resin base member.

The uneven structure of the resin base member is represented as a first uneven structure and an uneven structure of the region covered with the resin layer in the surface of the antireflection structure is represented as a second uneven structure. In the case in which the first uneven structure is wholly covered with the resin layer, the first uneven structure serves as a ground of the antireflection structure. In the case in which only a part of the first uneven structure is covered with the resin layer, the first uneven structure serves as the ground of the antireflection structure in a region in which the resin layer is formed, and configures the surface of the antireflection structure in a region in which the resin layer is not formed.

The height from the bottom part to the top part in the first uneven structure is equal to or smaller than the visible light wavelength. More specifically, the height which is equal to or smaller than the visible light wavelength is equal to or smaller than 380 nm which is a lower limit of a visible light wavelength region. The first uneven structure corresponds to the so-called Moth-eye structure, and can remarkably reduce a reflectance on a boundary surface between the antireflection structure and an outside (for example, an air layer) on the surface where the first uneven structure is formed.

A preferable upper limit of the height from the bottom part to the top part in the first uneven structure is 280 nm and a more preferable upper limit is 200 nm. A preferable lower limit of the height from the bottom part to the top part in the first uneven structure is 100 nm and a more preferable lower limit is 150 nm. In other words, the height from the bottom part to the top part in the first uneven structure is preferably 100 nm to 380 nm and is particularly suitably 150 nm to 200 nm. The mechanical strength of a protrusion in the first uneven structure can be ensured fully and a sufficient effect for reducing surface reflection can be obtained within a range of 150 nm to 200 nm.

In an example of a suitable configuration of the first uneven structure, the first uneven structure is obtained by transferring a surface structure of a mold onto the surface of the resin base member.

The antireflection structure includes the second uneven structure in at least a part of the surface. In other words, the surface of the antireflection structure may include only a region in which the second uneven structure is disposed (a region covered with the resin layer) or both a region in which the first uneven structure is disposed (a region which is not covered with the resin layer) and the region in which the second uneven structure is disposed (the region covered with the resin layer). In a configuration in which the surface of the antireflection structure includes only the region where the second uneven structure is disposed, adjustment into a tinge of a desirable reflection color is carried out over the whole surface of the antireflection structure. In a configuration in which the surface of the antireflection structure includes both the region where the first uneven structure is disposed and the region where the second uneven structure is disposed, a tinge of a reflection color in the region where the first uneven structure is disposed and that of a reflection color in the region where the second uneven structure is disposed are regulated to be different from each other. In the latter configuration, moreover, the reflection color in the region where the first uneven structure is disposed may be colorless.

The height from the bottom part to the top part in the second uneven structure is set to be smaller than the height from the bottom part to the top part in the first uneven structure. In other words, the second uneven structure also corresponds to the so-called Moth-eye structure. The height from the bottom part to the top part in the second uneven structure is determined by the height from the bottom part to the top part in the first uneven structure, a thickness of the resin layer filled in the bottom part of the first uneven structure and a thickness of the resin layer deposited on the top part of the first uneven structure. However, the resin layer does not need to be formed on the top part of the second uneven structure.

A preferable upper limit of the height from the bottom part to the top part in the second uneven structure is 280 nm. When the height is greater than 280 nm, the tinge of the reflection color in the second uneven structure is distinguished with difficulty. A preferable lower limit of the height from the bottom part to the top part in the second uneven structure is 100 nm. When the height is smaller than 100 nm, the effect for reducing the surface reflection by the Moth-eye structure is sufficiently obtained with difficulty.

The tinge of the reflection color presented by the second uneven structure represents a color of light reflected by the Moth-eye structure. As apparent from the fact that the reflectance of the Moth-eye structure is very low (for example, 0.1%), a quantity of light reflected by a boundary surface between a surface on which the second uneven structure is disposed and the outside (for example, an air layer) is very small. For this reason, in a state in which a large quantity of light is transmitted from a back side of the antireflection structure (for example, a state in which the antireflection structure is provided on a display device and the display device emits display light), a tinge seen through the antireflection structure is not changed greatly by the tinge of the reflection color presented by the second uneven structure. The tinge of the reflection color presented by the second uneven structure is mainly observed in a state in which a large quantity of light is not transmitted from the back side of the antireflection structure.

The thickness of the resin layer filled in the bottom part of the first uneven structure is preferably equal to or smaller than 50% of the height from the bottom part to the top part in the first uneven structure and is more preferably 25% to 50%.

A difference in height of the second uneven structure is smaller than that of the first uneven structure. For this reason, in the case in which the surface reflection color of the region where the first uneven structure is disposed is colorless (in an example of the uneven structure shown in a graph of FIG. 4, when the height from the bottom part to the top part in the first uneven structure is equal to or greater the 280 nm), it is possible to add a color to the surface reflection color of the region where the second uneven structure is disposed. Also in the case in which the surface reflection color of the region where the first uneven structure is disposed is colored, moreover, the surface reflection color can be changed. The color of the surface reflection light depends on the uneven structure, and particularly, is determined by a great influence of the difference in height. For instance, in an example of the uneven structure shown in the graph of FIG. 4, the color of the surface reflection light is green if the difference in height is approximately 210 nm, and is purplish red if the difference in height is approximately 185 nm. Accordingly, the reflection characteristic of the Moth-eye structure is varied by the resin layer filled in the bottom part of the first uneven structure. By regulating the thickness of the resin layer to be filled in the depression portion of the first uneven structure, it is possible to adjust the surface reflection color of the region where the second uneven structure is disposed. The surface reflection color relates to the tinge of the region where the second uneven structure is disposed, and can be utilized in the design of a product.

Moreover, the second uneven structure has a difference in height which is smaller than the first uneven structure. In other words, the bottom part of the first uneven structure of the resin base member is particularly a portion reinforced by the resin layer. Accordingly, the second uneven structure has a mechanical strength enhanced more greatly and is more excellent in a rubbing resistance than the first uneven structure. Furthermore, it is easy to scrape out dirt entering between the protrusions of the Moth-eye structure. Therefore, it is also possible to enhance wiping and antifouling properties of the antireflection structure.

A layer having a uniform thickness may be formed on the surface of the resin base member. In this case, the layer having the uniform thickness includes, on a surface, the same uneven structure as the uneven structure of the resin base member. The resin layer may cover the bottom part more thickly than the top part of the same uneven structure formed on the surface of the layer having the uniform thickness.

A layer having a uniform thickness may be formed on the surface of the resin layer. In this case, the layer having the uniform thickness includes the same uneven structure as the uneven structure of the resin layer in the region in which the resin layer covers the first uneven structure, and includes the same uneven structure as the uneven structure of the resin base member in the region in which the resin layer does not cover the first uneven structure.

Examples of a suitable configuration of the antireflection structure will be described below. The configurations may be employed in appropriate combination as long as the combination is not beyond the spirit of the present invention.

As an example of the suitable configuration, a height from a bottom part to a top part is 100 nm to 280 nm in an uneven structure of a surface of the antireflection structure which is formed by covering the uneven structure of the resin base member with the resin layer. In other words, it is preferable that the height from the bottom part to the top part in the second uneven structure should be 100 nm to 280 nm.

As an example of the suitable configuration, a thickness of the resin layer filled in the bottom part of the uneven structure of the resin base member is equal to or smaller than 280 nm. In consideration of the fact that the height from the bottom part to the top part in the first uneven structure is equal to or smaller than a visible light wavelength (380 nm or less) and a suitable range of the height from the bottom part to the top part in the second uneven structure is 100 nm to 280 nm, it is preferable that the thickness of the resin layer filled in the bottom part of the first uneven structure should be equal to or smaller than 280 nm.

As an example of the suitable configuration, the resin layer is disposed on the bottom part of the uneven structure of the resin base member more thickly by 20 nm to 100 nm than the top part of the uneven structure of the resin base member. In other words, a difference between the thicknesses of the resin layer in the bottom and top parts of the first uneven structure is preferably 20 nm to 100 nm and is more preferably 20 nm to 50 nm. By such a change of the thickness, the reflection color of the second uneven structure can be made different from the reflection color of the first uneven structure. Referring to the resin layer, it is sufficient as long as the resin layer covers at least the bottom part of the first uneven structure. The resin layer may be formed or does not need to be formed on the top part of the first uneven structure. In the case in which the resin layer is not formed on the top part of the first uneven structure, the thickness of the resin layer filled in the bottom part of the first uneven structure is preferably 20 nm to 100 nm and is more preferably 20 nm to 50 nm.

As an example of the suitable configuration, an uneven structure of a surface of the antireflection structure has a different shape from the uneven structure of the resin base member in a region covered with the resin layer. The resin layer covers the bottom part of the first uneven structure more thickly than the top part of the first uneven structure. Therefore, the first uneven structure and the second uneven structure take different shapes from each other.

As an example of the suitable configuration, the resin layer covers only a part of the first uneven structure. In this example, both the region provided with the first uneven structure and the region provided with the second uneven structure are formed on the surface of the reflection structure. The second uneven structure configures only a part of the surface of the antireflection structure and the designability of the antireflection structure can be enhanced by the tinge of the reflection color. In other words, it is preferable that the region provided with the first uneven structure and the region provided with the second uneven structure should be recognized as regions having different reflection colors from each other. A difference in the reflection colors is more remarkable as seen in an oblique direction (an inclined direction from a surface normal) than in a front direction (a direction of the surface normal). For this reason, it is preferable that the regions should be recognized as regions having different reflection colors as seen in an oblique direction which is inclined by at least 60°. The reason why a difference in the reflection color appears with more difficulty in the front direction than the oblique direction is as follows. A difference in the height of the protrusion of the uneven structure is apparently smaller in the front direction than an oblique direction and a reflectance is extremely low so that a quantity of reflected light is small and a color thereof is recognized with difficulty. On the other hand, when the difference in height of the uneven structure is gradually reduced in the oblique direction, the reflectance is increased so that the tinge can easily be recognized. In an oblique direction at an increased angle from the surface normal, a reflectance on a long wavelength side of visible light is slightly increased. For this reason, the tinge of the reflection color is slightly changed depending on the angle from the surface normal.

As an example of the suitable configuration, a thickness of the resin layer covering a first bottom part of the first uneven structure is different from a thickness of the resin layer covering a second bottom part of the first uneven structure. In this example, a difference in height of the second uneven structure formed in the region covering the first bottom part is different from a difference in height of the second uneven structure formed in the region covering the second bottom part. Therefore, at least two regions having different tinges of reflection colors from each other can be formed in the region where the second uneven structure is disposed. In this example, the surface of the reflection structure may include or does not need to include the region provided with the first uneven structure.

As an example of the suitable configuration, the resin layer is not provided on the top part of the first uneven structure of the resin base member. In this example, it is sufficient to adjust only the resin layer to be filled in the bottom part of the first uneven structure in order to regulate the height from the bottom part to the top part in the second uneven structure, and it is not necessary to regulate the thickness by both of the top and bottom parts of the first uneven structure, respectively. Therefore, it is easy to regulate the thickness of the resin layer.

As an example of the suitable configuration, a refractive index of a material of the resin layer is lower than a refractive index of a material of the resin base member. In this example, the refractive index of the resin layer positioned between the outside (usually, the air layer) and the resin base member has an intermediate value between the refractive index of the outside and that of the resin base member. Therefore, it is possible to effectively suppress the surface reflection of the reflection structure.

As an example of the suitable configuration, the material of the resin layer contains a fluorine atom. In this example, by employing a resin containing a fluorine compound, it is possible to reduce the refractive index and to enhance a slipping property, thereby suppressing a rise in the reflectance and enhancing a rubbing resistance. Moreover, the fluorine compound has an effect for reducing surface energy. Therefore, it is possible to prevent a transfer resin from being fixed to a mold. It is easy to scrape out dirt entering between the protrusions of the Moth-eye structure. Consequently, it is possible to enhance the wiping and antifouling properties of the antireflection structure. Examples of the fluorine compound include a compound including a fluoroalkyl group.

As an example of the suitable configuration, the first uneven structure is formed by transferring, onto a surface of the resin base member, a peculiar shape to a hole formed by selectively etching a metal oxide film. By using, for the transfer, the hole formed by selectively etching the metal oxide film, it is possible to efficiently form a uniform uneven structure. The hole formed at this time takes a peculiar shape corresponding to an etching condition. The metal oxide film can be formed by anodizing a metal film.

As an example of the suitable configuration, the resin base member is film-shaped. The antireflection structure using the film-shaped resin base member can be used as an antireflection film. In other words, the antireflection film can easily be attached onto a surface of an article which is to be subjected to antireflection processing, and can be utilized for various applications.

In the antireflection structure, the article itself to be subjected to the antireflection processing may be the resin base member. In this case, a surface structure of a mold is transferred to form the first uneven structure on the surface of the article to be subjected to the antireflection processing.

An aspect of the present invention is a display device including, on a display surface, the antireflection structure. The antireflection structure can be applied to every subject to be visually recognized or a tool for visual recognition, for example, a building material such as a window glass, a water tank and water glasses. Above all, the antireflection structure is suitably used for the display device.

An example of a suitable configuration of the display device will be described below. The configurations may be employed in appropriate combination as long as the combination is not beyond the spirit of the present invention.

As an example of the suitable configuration, a region in which the resin layer of the antireflection structure does not cover the first uneven structure is disposed in a frame region of the display surface, and the region in which the resin layer of the antireflection structure covers the first uneven structure is disposed in a display region of the display surface. In general, the frame region can be designed to attach importance to designability more greatly than the display region. In the case in which the frame region is colored, therefore, it is supposed to slightly regulate the tinge of the display region by using the resin layer in order to be matched with the frame region.

Contrary to the example described above, the region in which the resin layer of the antireflection structure does not cover the first uneven structure may be disposed in the display region of the display surface, and the region in which the resin layer of the antireflection structure covers the first uneven structure may be disposed in the frame region of the display surface. In this case, it is possible to enhance the designability by changing the tinge of the frame region with use of the resin layer. Moreover, it is possible to increase a mechanical strength of the frame region by using the resin layer.

As an example of the suitable configuration, the antireflection structure is attached to the display surface. If the antireflection structure is set to be an antireflection film, it can easily be attached to the display surface and can be applied to various display devices. Moreover, the antireflection film is attached to the display surface so that another layer is not provided between the antireflection film and the article to be subjected to the antireflection processing. Therefore, it is possible to effectively suppress reflection. Examples of a base member to which the antireflection film is attached include a polarizing plate, an acrylic protective plate, a hard coat layer disposed on a surface of the polarizing plate, an antiglare layer disposed on the surface of the polarizing plate and the like.

As an example of the suitable configuration, the display device is a liquid crystal display (LCD), a plasma display panel (PDP) or an organic electroluminescence display (OELD). These display devices are thin display devices which can be utilized in a personal digital assistant, a cell phone, a notebook computer or the like and are often used outdoors. For this reason, it is particularly effective to apply the antireflection structure.

Advantageous Effects of Invention

According to the present invention, resin coating is carried out over an ultra low reflection film (a Moth-eye sheet) including the Moth-eye structure, thereby controlling the thickness of the resin layer. Thus, it is possible to easily regulate the height of the Moth-eye structure. For this reason, it is possible to obtain at least one of the following advantages (1) to (5) without newly remaking the mold.

(1) It is possible to change the surface reflection color by varying the height of the Moth-eye structure. Consequently, it is possible to give a decorating function to the Moth-eye sheet. By using the Moth-eye sheet in a place where the display region gets down darkly in non-display of a television or the like, particularly, the color tone is emphasized so that a great decorating effect can be obtained.

(2) It is possible to deal with the production of many kinds of Moth-eye sheets in small quantities.

(3) A base part of the Moth-eye structure can be reinforced by resin coating. Therefore, it is possible to enhance mechanical strength (rubbing resistance: pencil hardness, steel wool tolerance).

(4) The protrusion height of the Moth-eye structure is substantially reduced. Therefore, it is possible to easily scrape out dirt entering between the protrusions. Consequently, it is possible to enhance the wiping and antifouling properties.

(5) By setting the refractive index of the resin layer to have the intermediate value between the refractive index of the air and that of the base member, it is possible to reduce the reflectance as compared with the case in which a Moth-eye structure simply having a small height is formed.

DESCRIPTION OF EMBODIMENTS

Figure 1:
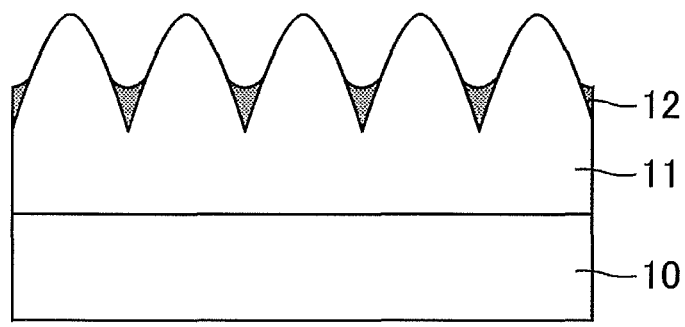
FIG. 1 is a schematic cross-sectional view showing a Moth-eye structure of an antireflection structure according to Embodiment 1.

The present invention will be mentioned in more detail referring to the drawings in the following embodiments, but is not limited to these embodiments.

In this specification, an uneven structure in which a height from a bottom part to a top part is equal to or smaller than a visible light wavelength (380 nm or less) will be referred to as a "Moth-eye structure". From a viewpoint of reduction in surface reflection, it is preferable that the Moth-eye structure should have a shorter cycle (a distance between adjacent tops) than a lower limit of a visible light wavelength (380 nm).

Embodiment 1

(1) Configuration of Antireflection Structure

FIG. 1 is a schematic cross-sectional view showing a Moth-eye structure of an antireflection structure according to Embodiment 1. The antireflection structure according to Embodiment 1 includes a transfer resin layer 11 on a base member film 10 and includes an uneven structure (a Moth-eye structure) on a surface of the transfer resin layer 11. The Moth-eye structure serves to reduce reflection on a surface of the antireflection structure. A film-shaped resin base member configured from the base member film 10 and the transfer resin layer 11 is used for the antireflection structure according to Embodiment 1. For this reason, the antireflection structure is referred to as an antireflection film, a Moth-eye sheet or a Moth-eye film. The Moth-eye film is mounted on a base member (a target article to reduce surface reflection). Consequently, it is possible to reduce surface reflection of visible light in various base members.

A resin layer 12 is filled in a depression portion of the Moth-eye structure of the transfer resin layer 11. As a result, a height from a bottom part to a top part in the Moth-eye structure of the antireflection structure is set to be smaller than a height from a bottom part to a top part in the Moth-eye structure of the transfer resin layer 11. More specifically, the Moth-eye structure of the transfer resin layer 11 has the height from the bottom part to the top part which is equal to or smaller than 380 nm, and the Moth-eye structure of the antireflection structure has the height from the bottom part to the top part which is equal to or smaller than 280 nm.

Figure 2:
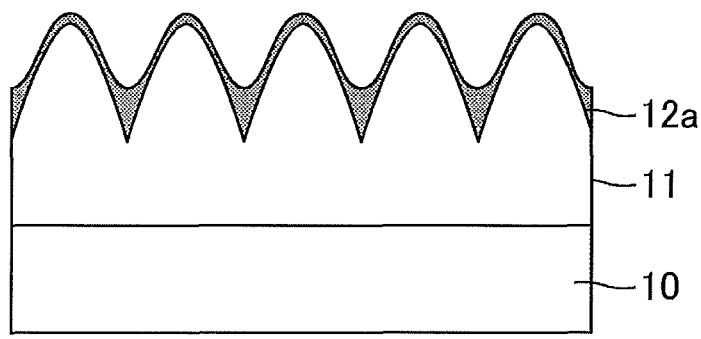
FIG. 2 is a schematic cross-sectional view showing a Moth-eye structure of an antireflection structure according to a modified example of Embodiment 1.

FIG. 1 shows an example in which the resin layer 12 is formed on only the depression portion of the Moth-eye structure of the transfer resin layer 11 and the resin layer 12 is not formed on a protrusion portion (the top part) of the Moth-eye structure of the transfer resin layer 11. As shown in FIG. 2, however, a resin layer 12a may be formed on the protrusion portion (the top part) of the Moth-eye structure of the transfer resin layer 11 in addition to the depression portion of the Moth-eye structure of the transfer resin layer 11. In the case in which the resin layer 12a is formed on the protrusion portion (the top part) of the Moth-eye structure of the transfer resin layer 11, a film thickness of the resin layer 12a provided on the depression portion of the Moth-eye structure of the transfer resin layer 11 is to be greater than that of the resin layer 12a provided on the protrusion portion (the top part) of the Moth-eye structure of the transfer resin layer 11 in order to cause the height from the bottom part to the top part of the Moth-eye structure of the antireflection structure to be smaller than the height from the bottom part to the top part of the Moth-eye structure of the transfer resin layer 11.

As shown in FIG. 2, the protrusion portion (the top part) of the Moth-eye structure of the transfer resin layer 11 can be protected in the configuration in which the resin layer 12a is formed on the protrusion portion (the top part) of the Moth-eye structure of the transfer resin layer 11. In the case in which fluorine is blended in the resin layer 12a, particularly, it is possible to reduce a coefficient of friction, thereby enhancing a slipping property. As a result, a thing coming in contact with the protrusion portion (the top part) slips. Consequently, it is possible to more effectively prevent the protrusion portion (the top part) from being broken.

By providing the resin layer 12, it is possible to reduce the height of the protrusion portion of the Moth-eye structure of the antireflection structure and to decrease a depth of the depression portion as compared with the Moth-eye structure of the transfer resin layer 11. Consequently, a reflectance characteristic obtained from the Moth-eye structure is changed. If the height of the protrusion portion of the Moth-eye structure is equal to or greater than 280 nm, reflected light has substantially the same color as incident light. In an environment having white light, therefore, the reflected light of the Moth-eye structure has a white color (an achromatic color). When the height of the protrusion portion of the Moth-eye structure is gradually reduced to be smaller than 280 nm, there is a tendency that a reflectance of a long wavelength component of visible light is raised more considerably than a reflectance of a short wavelength component of the visible light. For this reason, the light reflected by the surface of the Moth-eye structure has a small quantity due to a low reflection characteristic of the Moth-eye structure and is tinged with red as compared with the incident light.

The Moth-eye structure of the transfer resin layer 11 is formed by transferring a surface structure of a mold as will be described below. In order to change the height of the Moth-eye structure, therefore, it is necessary to change the mold. However, it is not easy to manufacture a mold in which a very fine uneven structure such as the Moth-eye structure is evenly distributed in a uniform size. It is hard to separately manufacture Moth-eye structures in various sizes and patterns from a viewpoint of a production efficiency.

In the present embodiment, it is possible to regulate the height of the Moth-eye structure by varying a filling degree of the resin layer 12. For this reason, it is sufficient to regulate the filling degree of the resin layer 12 without requiring to arrange a number of molds which corresponds to types of sizes and patterns of a desirable Moth-eye structure. Accordingly, it is possible to easily adjust the reflection color of the Moth-eye structure, thereby implementing a desirable reflection color. By utilizing this, it is possible to adjust the reflection color of the Moth-eye structure depending on an attached target of the Moth-eye film and to give decorativeness to the Moth-eye film by providing regions having different reflection colors in the Moth-eye film.

The base member film 10 is not directly related to control of a shape of the Moth-eye structure but serves as a ground in the formation of the transfer resin layer 11. The base member film 10 having a high mechanical strength and transparency is suitable. Examples of a material of the base member film 10 include TAC (triacetylcellulose) and an acrylic resin.

The transfer resin layer 11 serves to be transferred with the surface structure of the mold, thereby forming the Moth-eye structure. The transfer resin layer 11 having a high mechanical strength (abrasion resistance), transparency and mold releasing property is suitable. Examples of a material of the transfer resin layer 11 include an acrylic resin and polyethylene terephthalate (PET). In the case in which the transfer resin layer 11 formed by the transfer is carefully examined, there are sometimes observed a shape defect caused by catching air between the mold and the resin during the transfer, a shape abnormality caused by a foreign substance sticking to the mold, and mixing of a foreign substance into a resin. It can be said that these are incidental structural features generated by the transfer formation.

It is preferable that the resin layer 12 should consist of a transparent resin. Since the resin layer 12 is a very thin layer, however, it is possible to generally use a resin which is not classified as the transparent resin. It is preferable that the refractive index of the resin layer 12 should be equal to or lower than that of the transfer resin layer 11 forming the Moth-eye structure. The reason is as follows. The resin layer 12 is provided between the transfer resin layer 11 and the air. In order to prevent a reflectance characteristic from being reduced (to prevent a reflectance from being raised) by the resin layer 12, therefore, it is preferable to set an intermediate refractive index between the transfer resin layer 11 and the air. The air has a refractive index of 1.0 and the transfer resin layer 11 has a refractive index of approximately 1.5 (for example, 1.5 in the case of the acrylic resin and 1.57 in the case of the PET). For this reason, it is preferable that the resin layer 12 should have a refractive index of less than 1.5. Examples of the resin layer 12 having such refractive index include a resin containing fluorine. If the material of the transfer resin layer 11 is the PET (n=1.57), it is possible to reduce the refractive index of the resin layer 12 to be lower than that of the transfer resin layer 11 even if the material of the resin layer 12 is the acrylic resin or the resin containing the fluorine. On the other hand, in the case in which the material of the transfer resin layer 11 is the acrylic resin, it is possible to reduce the refractive index of the resin layer 12 to be lower than that of the transfer resin layer 11 by using the resin containing the fluorine as the material of the resin layer 12. Moreover, the acrylic resin is usually prepared by properly blending plural types of acrylic monomers and oligomers. By regulating the blend to reduce the refractive index to be lower than that of the acrylic resin used in the transfer resin layer 11, therefore, it is possible to set the lower refractive index of the resin layer 12 than the refractive index of the transfer resin layer 11 even if the acrylic resin is used for both the transfer resin layer 11 and the resin layer 12. Even if the same acrylic resin is used for both the transfer resin layer 11 and the resin layer 12, the refractive index of the resin layer 12 can be set to be equal to that of the transfer resin layer 11, which has no problem.

Figure 3:
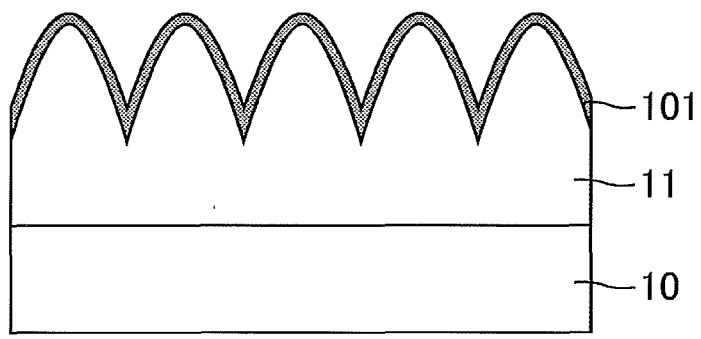
FIG. 3 is a schematic cross-sectional view showing a conventional antireflection structure in which a monomolecular film is uniformly formed on a surface of a Moth-eye structure.

In the case in which a monomolecular film 101 is uniformly formed on a surface like a mold releasing agent, both a protrusion portion (a top part) and a depression portion (a bottom part) in the Moth-eye structure have almost uniform film thicknesses as shown in FIG. 3 differently from the resin layers 12 and 12a shown in FIGS. 1 and 2. For this reason, the height of the Moth-eye structure is not substantially changed by the presence or absence of the monomolecular film 101. As a result, the reflection characteristic is not varied.

Examples of a method of forming the resin layer 12 include spin coating, gravure coating, die coating, spraying and the like. From a viewpoint of the regulation of the filling degree of the resin (the coating quantity of the resin) into the depression portion of the Moth-eye structure, the spin coating capable of regulating a film thickness depending on a rotating speed is suitable. On the other hand, from a viewpoint of use of the continuous base member film 10, the gravure coating, the die coating and the like are suitable. At this time, it is desirable to contain a resin serving as a material of the resin layer in a solvent, thereby regulating a coating thickness depending on a solid content concentration.

(2) Reflectance Characteristic of Antireflection Structure

From such a viewpoint as to obtain a sufficiently low reflection characteristic in a whole wavelength of 380 nm to 780 nm of a visible light region, the height of the protrusion of the Moth-eye structure is set to be equal to or greater than 200 nm. When the height of the protrusion is changed, the wavelength characteristic of the reflectance is changed and is particularly varied notably in a long wavelength region. When the height of the protrusion is set to be approximately 170 nm, the reflectance of a red region of visible light is increased. As a result, the surface of the Moth-eye film is seen to be slightly reddish.

Figure 4:
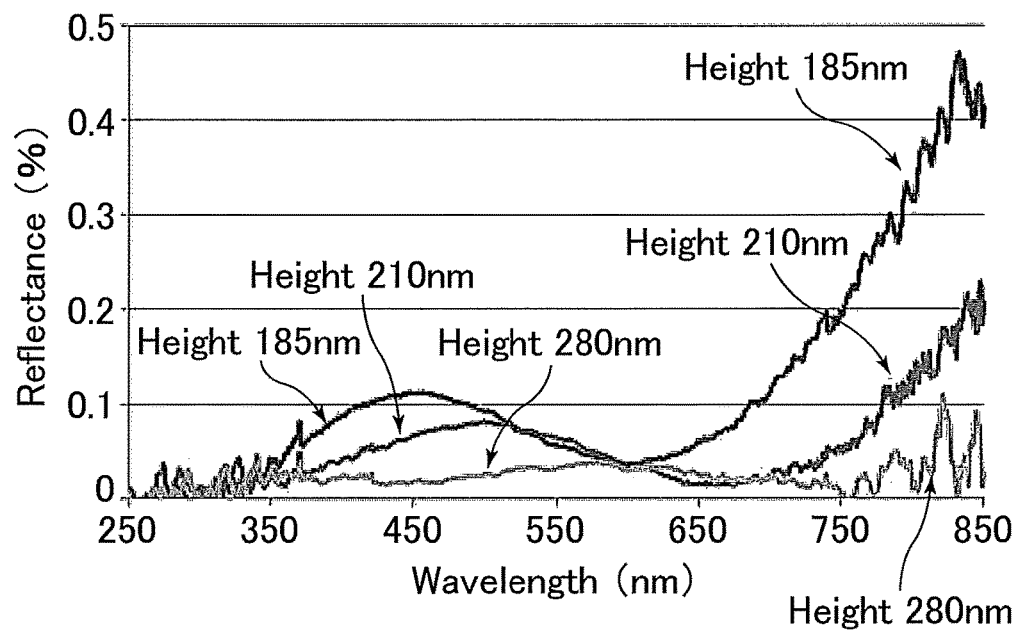
FIG. 4 is a graph showing a relationship between an incident light wavelength (nm) and a reflectance (%) for each height of a Moth-eye structure.

FIG. 4 is a graph showing a relationship between an incident light wavelength (nm) and a reflectance (%) (wavelength dependence of the reflectance) for each height of a Moth-eye structure. It is indicated that a reflectance of a red region is increased and the surface of the Moth-eye film is tinged with red at a height of 185 nm. At a height of 210 nm, the reflection of the red region is suppressed and the surface is seen in a color tinged with green. At a height of 280 nm, particularly, there is no wavelength indicative of a maximum reflectance and a value of the reflectance is small over the visible light region and is flat. For this reason, the light reflected by the Moth-eye structure is almost colorless and a quantity thereof is very small. According FIG. 4, thus, it is apparent that a reflection color from the surface of the Moth-eye film is seen differently depending on the height of the protrusion.

In FIG. 4, a reflectance (Y) of a protrusion having the height of 185 nm is 0.059%, a reflectance (Y) of a protrusion having the height of 210 nm is 0.057%, and a reflectance (Y) of a protrusion having the height of 280 nm is 0.031%. Herein, the reflectance (%) indicates a Y value of an "XYZ color system (CIE1931 color system)". In other words, the reflectance (%) is the Y value in X, Y and Z values of an object color through reflection in the XYZ color system. The Y value is an integrated value in the whole visible light region having a wavelength of 380 nm to 780 nm and does not represent a reflectance in a specific wavelength.

Figure 5:
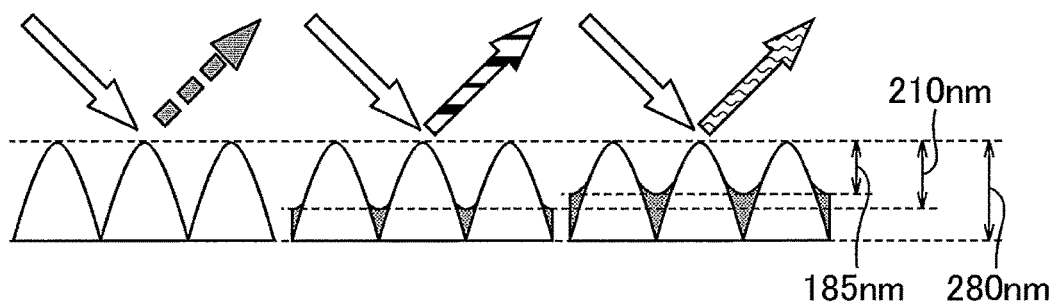
FIG. 5 is a view for explaining a change in the relationship between the incident light wavelength (nm) and the reflectance (%) for each height of a Moth-eye structure.

Next, a change in a tinge of the reflection color from the surface of the Moth-eye film depending on the height of the Moth-eye structure will be conceptually described with reference to FIG. 5. FIG. 5 is a view for explaining a change in the relationship between the incident light wavelength (nm) and the reflectance (%) for each height of a Moth-eye structure. In the case in which the resin layer is not formed (before the resin is coated) as in an example of a left end of FIG. 5, an optical characteristic is determined by the height of the protrusion of the transfer resin layer 11 itself. When the resin layer is formed and the portion between the protrusions of the transfer resin layer 11 is filled with the resin layer, the height of the protrusion of the Moth-eye structure is the height from the surface of the resin layer 12 in the depression portion of the transfer resin layer 11 to the tip of the protrusion of the transfer resin layer 11 as in examples of a center and a right end of FIG. 5. For this reason, when the thickness of the resin layer is increased, the height of the protrusion of the Moth-eye structure is reduced.

If the visible light wavelength region has an almost flat low reflection characteristic before the formation of the resin layer, accordingly, there is a tendency that the reflectance of the red region is gradually increased with increase in the thickness of the resin layer. In the case in which the tip of the protrusion is filled with the resin, however, the shape of the protrusion is not present any longer. For this reason, the function of the Moth-eye structure does not appear.

The graph of FIG. 4 shows a result obtained by measurement on a condition of regular reflection with an angle of 5°. The tinge of the reflection color is varied depending on an angle at which the surface of the Moth-eye film is seen. In a direction inclined from a vertical direction with respect to the surface of the Moth-eye film, an apparent height of the protrusion of the Moth-eye structure is reduced. Therefore, the reflectance of the red region is increased. When the Moth-eye film including a protrusion in a height of 185 nm is seen obliquely, accordingly, redness is emphasized more greatly.

Figure 6:
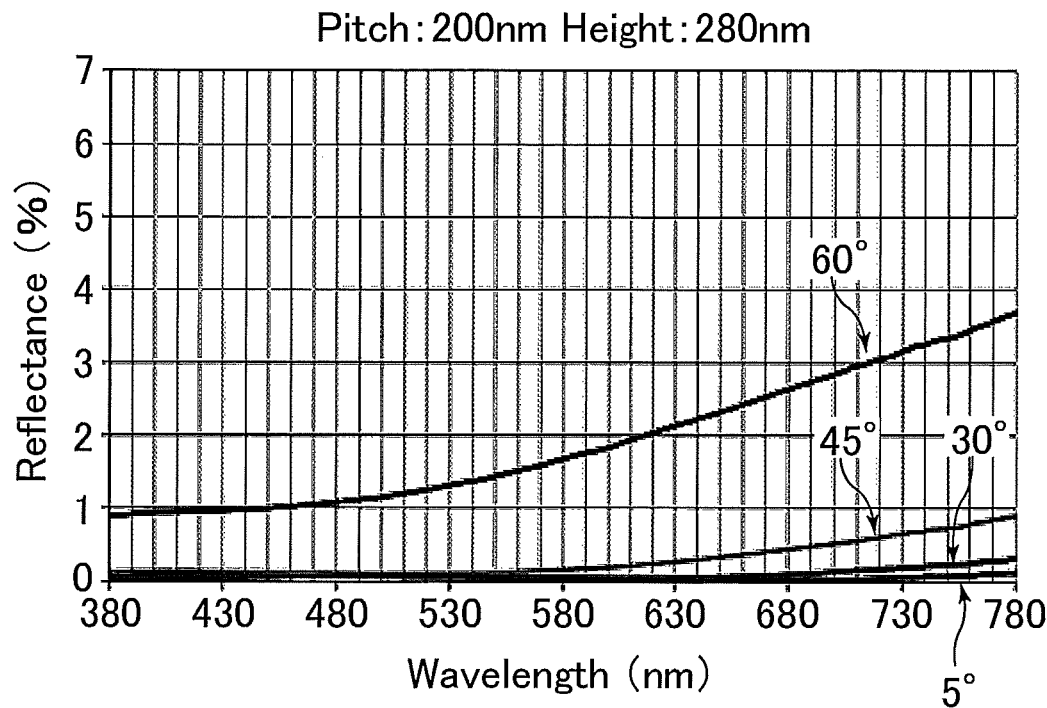
FIG. 6 is a graph showing a change in the reflectance (%) in the case in which light is incident at an incident angle of 5° to 60° with respect to a surface normal in a Moth-eye structure having a pitch of 200 nm and a height of 280 nm.
Figure 7:
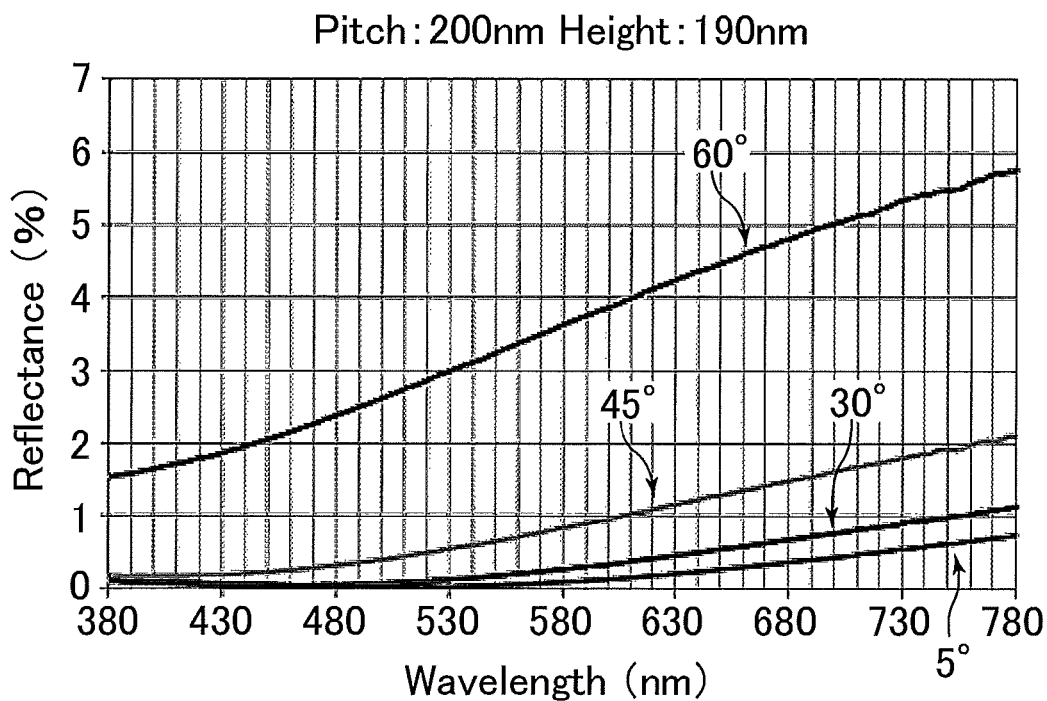
FIG. 7 is a graph showing a change in the reflectance (%) in the case in which light is incident at an incident angle of 5° to 60° with respect to a surface normal in a Moth-eye structure having a pitch of 200 nm and a height of 190 nm.

Graphs shown in FIGS. 6 and 7 show a result obtained by measuring the reflectance (%) for the Moth-eye film including protrusions in different heights. FIG. 6 is a graph showing a change in the reflectance (%) in the case in which light is incident at an incident angle of 5° to 60° with respect to a surface normal in a Moth-eye structure having a pitch of 200 nm and a height of 280 nm. FIG. 7 is a graph showing a change in the reflectance (%) in the case in which light is incident at an incident angle of 5° to 60° with respect to a surface normal in a Moth-eye structure having a pitch of 200 nm and a height of 190 nm. The graphs in FIGS. 6 and 7 show results obtained by measuring with the incident angle of the light being inclined at 5°, 30°, 45° and 60° from a normal direction with respect to the surface of the Moth-eye film.

In FIGS. 6 and 7, as is apparent from the fact that the reflectance at 5° is the lowest, the Moth-eye film has the lowest reflectance with respect to the light incident at a close angle to a vertical state. When the incident angle is increased, the reflectance is raised at the long wavelength side. Moreover, it is apparent that a greater height of the protrusion causes a rise in the reflectance to be gentler for increase in the incident angle.

Figure 8:
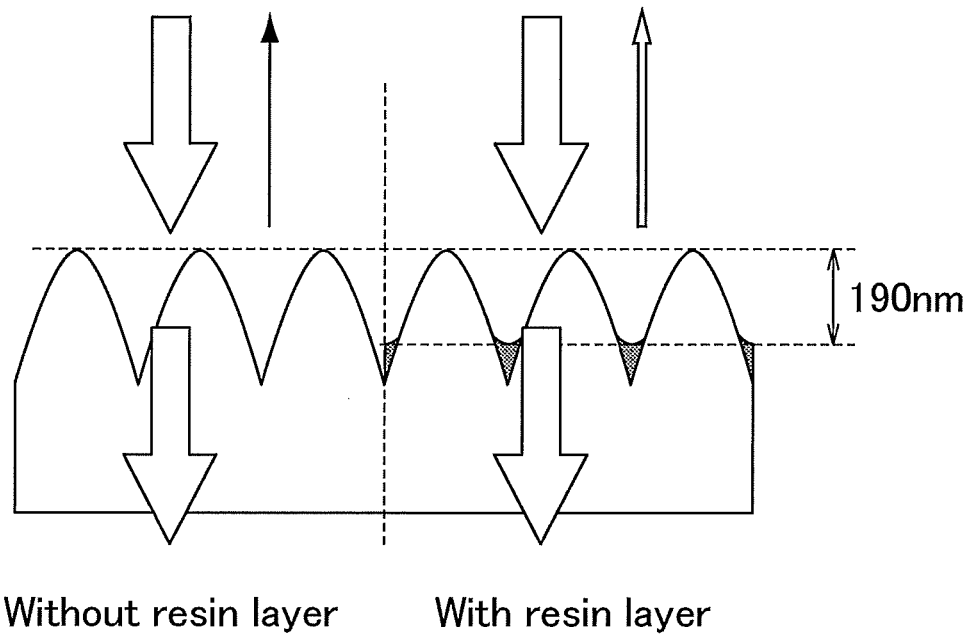
FIG. 8 is a view for explaining a reflection characteristic in the case in which light is incident in a vertical direction with respect to the Moth-eye structures shown in FIGS. 6 and 7.
Figure 9:
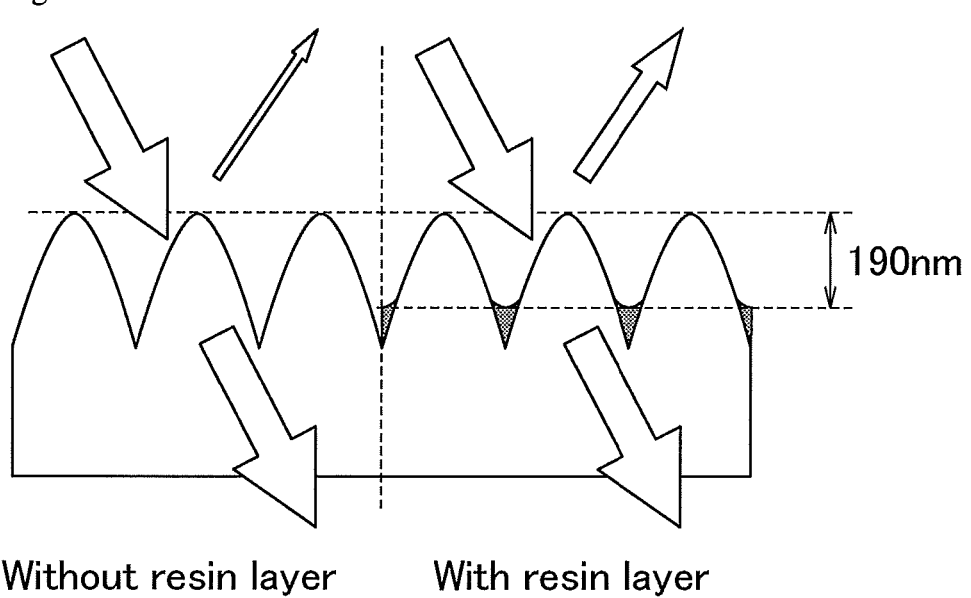
FIG. 9 is a view for explaining a reflection characteristic in the case in which light is incident in an oblique direction with respect to the Moth-eye structures shown in FIGS. 6 and 7.
Figure 10:
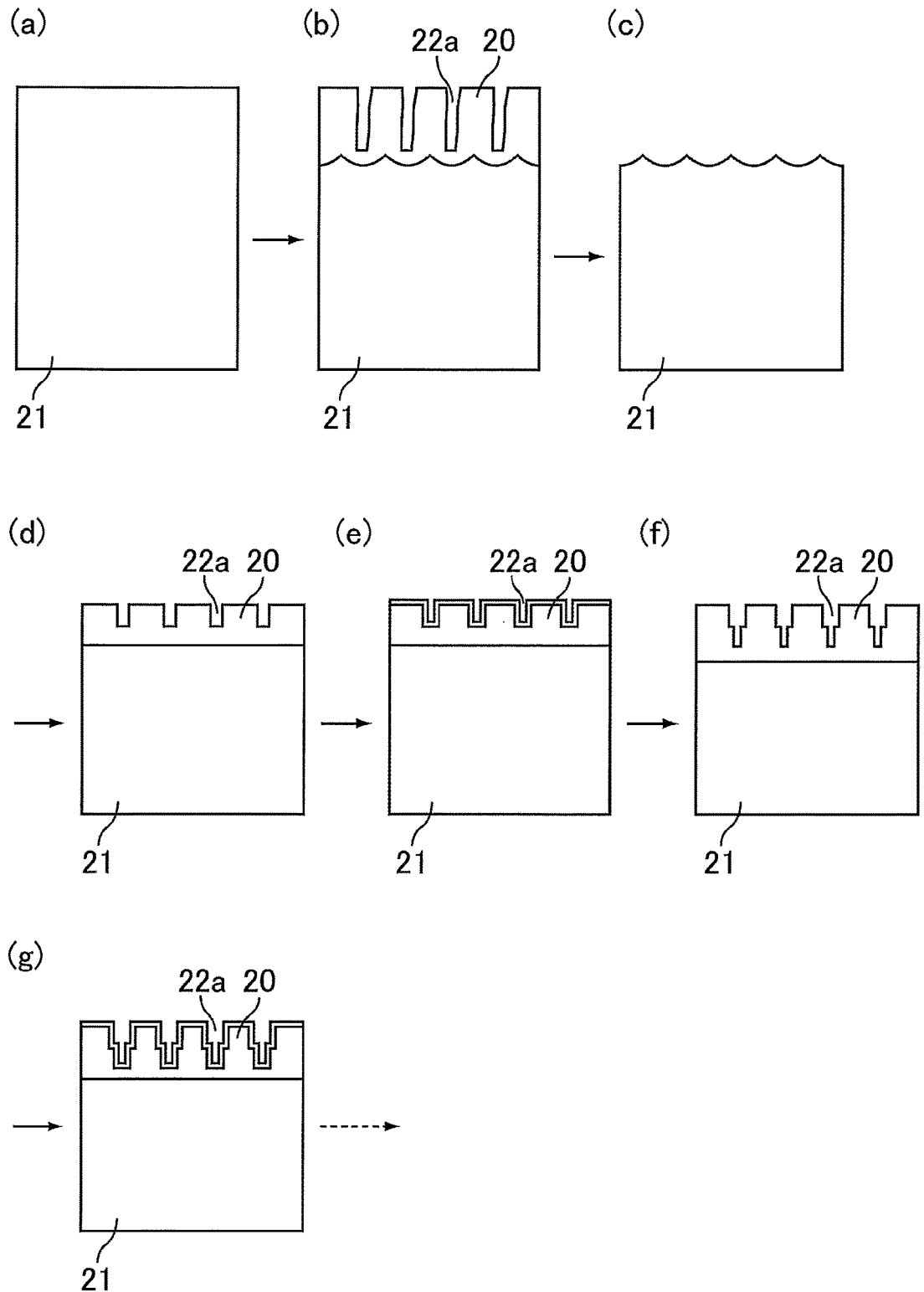
FIGS. 10(a) to 10(g) are views for explaining a method of manufacturing a mold for transferring a Moth-eye structure.
Figure 11:
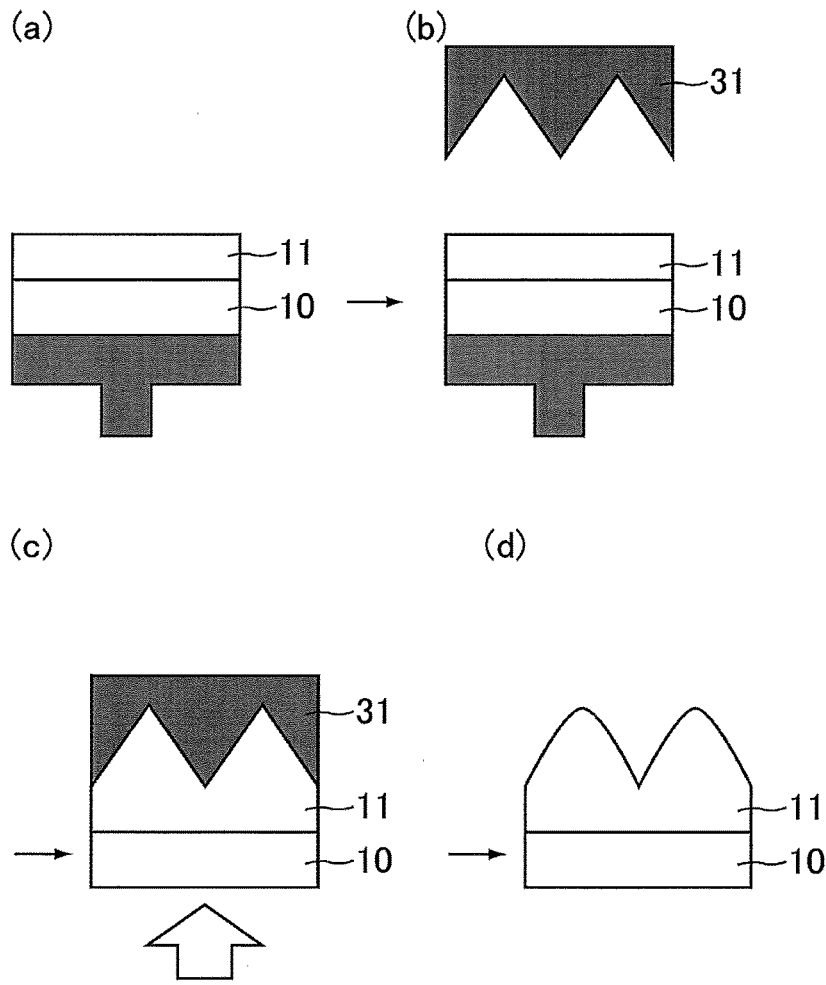
FIGS. 11(a) to 11(d) are views for explaining a transfer process of a Moth-eye structure.

FIG. 8 is a view for explaining a reflection characteristic in the case in which light is incident in a vertical direction with respect to the Moth-eye structures shown in FIGS. 6 and 7, and FIG. 9 is a view for explaining a reflection characteristic in the case in which light is incident in an oblique direction with respect to the Moth-eye structure shown in FIGS. 6 and 7. As shown in FIGS. 8 and 9, a reflectance is very low at a close incident angle to the vertical state and a difference therebetween is slight in both a Moth-eye film including a high protrusion in which a resin layer is not formed and a Moth-eye film including a low protrusion in which the resin layer is formed. On the other hand, when the incident angle is increased, the reflectance tends to be remarkably increased in the Moth-eye film including the low protrusion. For example, in the case in which the incident angle is 60°, the Moth-eye film including the resin layer has a reflectance which is higher by approximately 2%. Therefore, a difference in a tinge is recognized. By setting the protrusion of the Moth-eye structure to be low by providing the resin layer, accordingly, it is possible to regulate a tinge.

Moreover, it is preferable that a pitch of the protrusion of the Moth-eye structure (an interval between the adjacent protrusions) should be equal to or smaller than 380 nm. If the pitch is sufficiently smaller than the wavelength of the visible light, the pitch does not influence the reflection characteristic. When the pitch approximates 380 nm to be a lower limit of the wavelength of the visible light, however, the visible light in the short wavelength region is apt to be influenced. In the case in which regularity of disposition of the protrusion is low, scattering is generated. In the case in which the protrusions are arranged in order and the regularity of the disposition of the protrusion is high, there is a tendency that diffraction is caused. Blue light having a short wavelength is apt to be scattered. For this reason, the Moth-eye film becomes blue-tinged in the scattering. In the diffraction, strong light is observed at a certain viewing angle.

It is more preferable that the pitch of the protrusion of the Moth-eye structure should be equal to or smaller than 200 nm. In some cases in which the pitch is greater than 200 nm, the Moth-eye surface is seen to be pale and clouded by the scattering when the Moth-eye surface is seen in an oblique direction (the vicinity of 60° or more) with great inclination from the normal of the Moth-eye surface. If the pitch is set to be equal to or smaller than 200 nm, the scattering can be suppressed sufficiently. If the pitch is equal to or smaller than 200 nm, accordingly, the tinge of the reflected light is not changed by the influence of the pitch.

Moreover, there is a possibility that the protrusion shape of the Moth-eye structure might slightly change the reflectance against each wavelength to influence the tinge of the reflected light. However, such a shape as to be gradually thinned toward the tip of the protrusion can change the refractive index on an interface at a constant rate with respect to a travelling direction of light. Thus, a desirable reflection characteristic can be obtained. In the present embodiment, a unit structure of the Moth-eye structure formed on the surface of the antireflection structure takes a bell shape. The unit structure may take a shape other than the bell shape or may take a spindle shape such as a conical shape or a square pyramid shape.

(3) Other Characteristic of Antireflection Structure

According to the structure in which the protrusion of the Moth-eye structure is lowered by the resin layer, dirt entering between the protrusions can easily be removed. For example, in the case in which the Moth-eye film is disposed on an outermost surface of a display device including a touch panel, easiness to wipe a sticking sebum can be enhanced. In other words, it is apparent that the structure for lowering the protrusion of the Moth-eye structure by the resin layer serves to reinforce, with the resin layer, the base of the protrusion of the Moth-eye structure which is originally present. Accordingly, it is possible to enhance the mechanical strength (tolerance) of the surface of the Moth-eye film.

(4) Method of Manufacturing Antireflection Structure

(4-1) Manufacture of Mold for Transferring Moth-Eye Structure

FIGS. 10(a) to 10(g) are views for explaining a method of manufacturing a mold for transferring a Moth-eye structure. With reference to FIG. 10, an example in which a mold for forming a Moth-eye film is manufactured will be described below.

First of all, an aluminum (Al) base member 21 was prepared (FIG. 10(a)). For the Al base member 21, an Al film may be formed on another base member. In that case, it is assumed that a thickness of the Al film is 1.0 µm, for example.

As shown in FIG. 10(b), next, a surface layer portion of the Al base member 21 was anodized to form a porous alumina layer 20, and the porous alumina layer 20 was etched to form a large number of minute depression portions (pores) 22a in visible light wavelength order or less at a regular interval within a wide range of the surface. It is possible to control a size of the depression portion 22a, a generation density, a depth of the depression portion 22a or the like depending on anodizing conditions, for example, a formation voltage, a type of an electrolyte, a concentration of an electrolyte, a processing time or the like. By controlling a magnitude of the formation voltage in the anodization, it is possible to control regularity of an array of the depression portion 22a.

There is a tendency that the array of the depression portion 22a is disordered in the porous alumina layer 20 to be generated in an initial stage. For this reason, reproducibility is taken into consideration. In the present embodiment, as shown in FIG. 10(c), the porous alumina layer 20 formed first was removed. The removal is carried out to leave only a portion in which distances between dents in a bottom part are almost equal to each other. At a next anodizing step (FIG. 10(d)), thus, it is possible to determine a position in which a hole is to be formed.

As shown in FIG. 10(d), then, the anodization was carried out again to form the porous alumina layer 20 including the depression portion 22a. As shown in FIG. 10(e), next, the porous alumina layer 20 including the depression portion 22a was caused to come in contact with an alumina etchant to be subjected to isotropic etching by a predetermined quantity. Thus, a pore diameter of the depression portion 22a was increased (widening). Herein, a voltage of 80V was applied to an electrolyte containing 0.6 wt % of oxalic acid at a solution temperature of 5° C. for 24 seconds to carry out the anodization, and immersion was performed in a solution containing 1 mol/L of phosphoric acid at a solution temperature of 30° C. for 25 minutes, thereby executing the etching. For the anodization, it is also possible to use an acidic electrolyte such as sulfuric acid or phosphoric acid or an alkaline electrolyte in place of the oxalic acid.

As shown in FIG. 10(f), then, the Al base member 21 was partially anodized again to grow the depression portion 22a in a depth direction and to increase a thickness of the porous alumina layer 20. Herein, the growth of the depression portion 22a is started from the bottom part of the depression portion 22a which has already been formed. Therefore, a side surface of the depression portion 22a is stepped. In addition, then, the porous alumina layer 20 was caused to come in contact with the alumina etchant to be further subjected to etching so that the pore diameter of the depression portion 22a was further enlarged as shown in FIG. 10(g).

Thus, the anodizing step (FIG. 10(d)) and the etching step (FIG. 10(e)) are repeated so that the porous alumina layer 20 including the desirable depression portion 22a is obtained. Herein, the anodization and the etching were alternately performed, and the anodization was executed five times and the etching was executed four times to manufacture a mold including conical holes in a pitch between adjacent holes of 200 nm and a depth of 380 nm.

The method of manufacturing a mold for transfer is not restricted to the method of repetitively carrying out the anodization and the etching but an electron beam drawing method or a method using interference exposure of laser beams may be utilized, for example.

Moreover, a material for forming the depression portion in the mold for transfer is not restricted to an Al base member or an Al film but includes (1) a glass substrate, (2) a metallic material such as SUS or Ni, and (3) a resin material, such as polypropylene, polymethylpentene, a polyolefin-based resin such as cyclic olefin-based polymer (typically, a product name of "ZEONOR" [manufactured by Zeon Corporation], a product name of "ARTON" [manufactured by JSR Corporation] or the like which is a norbornene-based resin or the like), a polycarbonate resin, polyethylene terephthalate, polyethylene naphthalate or triacetylcellulose, for example.

<Manufacture of Moth-Eye Film>

FIGS. 11(a) to 11(d) are views for explaining a transfer process of a Moth-eye structure. With reference to FIG. 11, a method of manufacturing an antireflection film will be described.

First of all, as shown in FIG. 11(a), a base member film 10 is prepared and is coated with a transfer resin 11, and is thus dried. A type of the base member is not particularly restricted but base members formed by constituting materials such as glass, plastic, metal or the like are taken as an example. The transfer resin 11 is not particularly restricted but an ultraviolet curable resin is suitably used as the transfer resin 11 in the case of optical nano imprint, and PAK01 (manufactured by TOYO GOSEI Co., Ltd.) and SU-8 (manufactured by NIPPON KAYAKU Co., Ltd.) are taken as an example.

As shown in FIG. 11(b), next, a mold 31 manufactured by the method described above is disposed on a surface to which the Moth-eye structure of the transfer resin 11 is given. A surface of the mold 31 is coated with a mold releasing/antifouling agent. By coating the mold 31 with the mold releasing/antifouling agent, it is possible to extend a durable period of the mold 31.

As shown in FIG. 11(c), next, the mold 31 is pushed against the transfer resin 11, and furthermore, ultraviolet rays are irradiated to cure the transfer resin 11. Consequently, a nanostructure pattern formed in the mold 31 can be transferred to the transfer resin 11. By the above steps, an antireflection film is finished (FIG. 11(d)).

Figure 12:
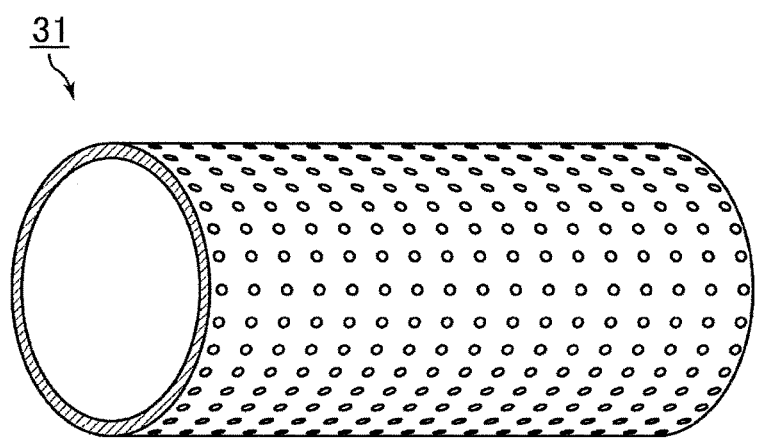
FIG. 12 is a schematic perspective view showing an example of a mold for continuously transferring a Moth-eye structure.

The manufacturing step in the successive (batch) processing has been described above. In-line continuous processing may be carried out in the following manner. Although a mold for transfer may be flat plate-shaped, a roll type mold 31 shown in FIG. 12 is suitably used in the in-line continuous processing. FIG. 12 is a schematic perspective view showing an example of a mold for continuously transferring a Moth-eye structure. In FIG. 12, a large number of circles (O) described on the surface of the mold 31 schematically represent a depression portion to be used for transferring the Moth-eye structure. Since FIG. 12 is a schematic view, depression portions are showed to be disposed at an interval. They are laid without a gap in an actual mold. Examples of the roll type mold 31 include a roll type manufactured by cutting Al or a mold including an aluminum film formed on a surface of a thin sleeve tube serving as a base member.

Figure 13:
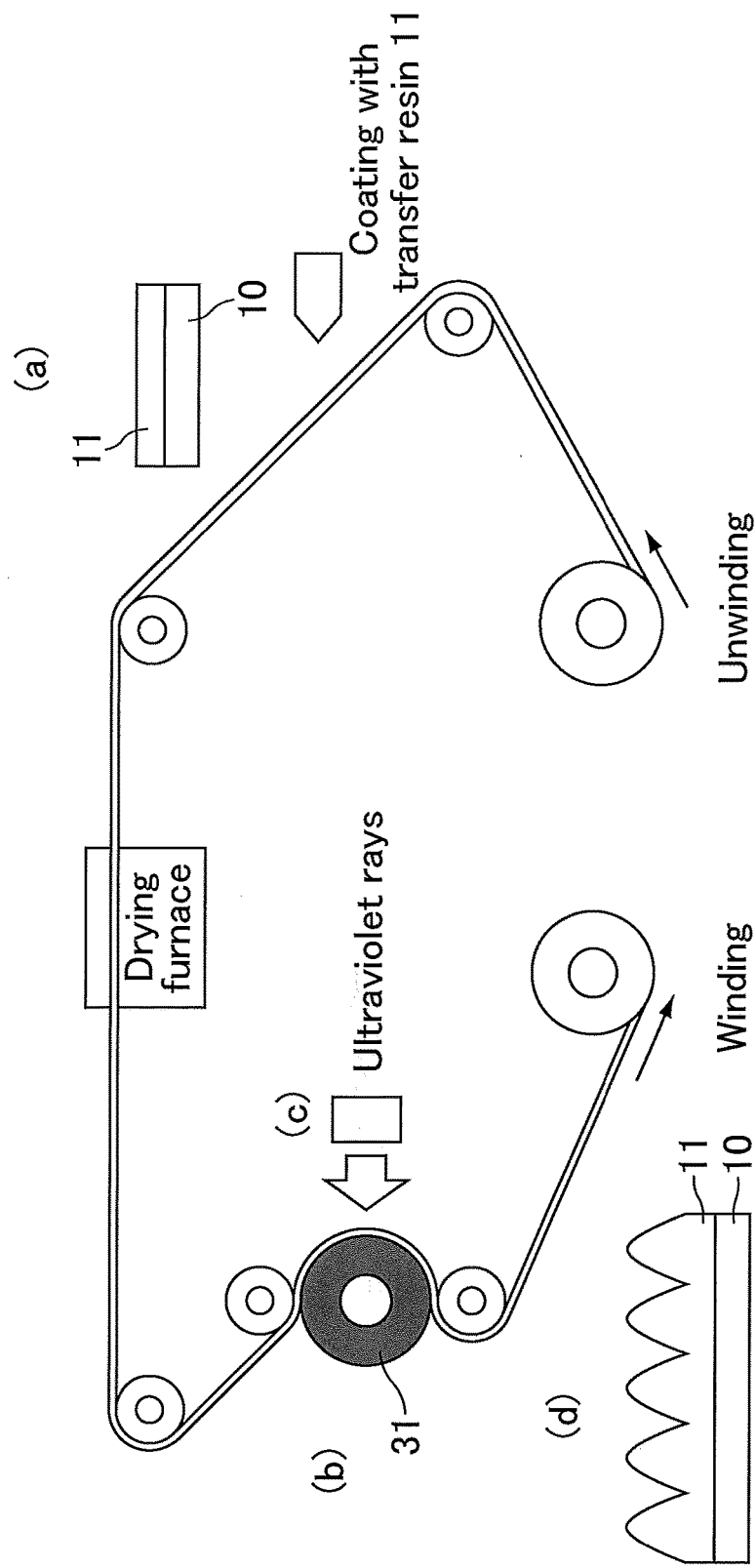
FIG. 13 is a schematic perspective view showing an example of a process for continuously forming a Moth-eye structure on a base film.

FIG. 13 is a schematic perspective view showing an example of a process for continuously forming a Moth-eye structure on a base film. Manufacturing steps (a) to (d) in FIG. 13 correspond to the manufacturing steps (a) to (d) in FIG. 11.

First of all, a base member film (for example, a TAC film) 10 is coated with a transfer resin 11 (FIG. 13(a)), and then the transfer resin 11 is dried in a drying furnace. Next, a rotating roll-shaped mold 31 is pushed against the transfer resin 11 (FIG. 13(b)), and at the same time, ultraviolet rays are irradiated on the transfer resin 11 in an accumulated light quantity of 2 J/cm$^2$ (FIG. 13(c)). At this time, the Moth-eye structure is formed on the surface of the transfer resin 11 by the continuous transfer through the mold (the roll type for transfer) 31 including a surface on which an inversion pattern of the Moth-eye structure is provided. As described above, the surface structure of the mold 31 is transferred by a roll-to-roll method of executing each step sequentially and continuously. Consequently, a Moth-eye film before resin embedding is finished (FIG. 13(d)).

For the transfer resin 11, it is also possible to use an acrylic resin containing no solvent or an acrylic resin containing a solvent (for example, methyl-ethyl-ketone (MEK), methyl-isobutyl-ketone (MEBK), or toluene). A solid content concentration is properly regulated into approximately 0.1 wt % to 2.0 wt %. The solvent is usually removed in the drying furnace after coating. In the foregoing, the Moth-eye structure is formed by combination (UV imprint) of embossing and ultraviolet ray irradiation. However, heat or visible light may be used for curing the transfer resin 11 in place of the ultraviolet rays.

Figure 14:
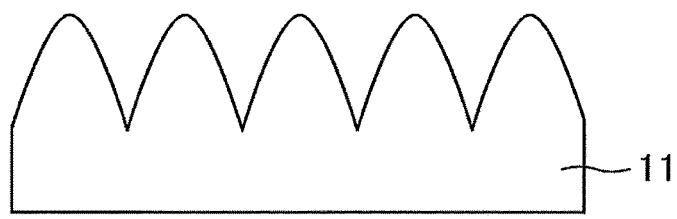
FIG. 14 is a view for explaining formation of a resin layer on a Moth-eye structure by coating.
Figure 14:
Figure 14:
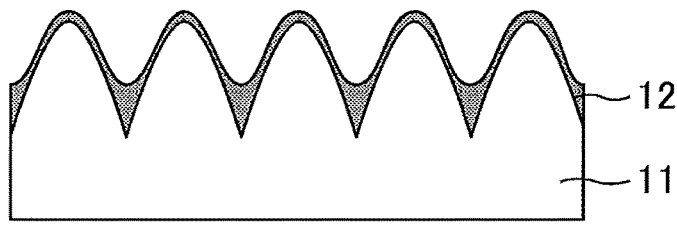

As shown in FIG. 14, then, a resin is filled in the depression portion of the Moth-eye structure formed in the transfer resin layer 11 to form the resin layer 12. Examples of a method of filling a resin includes spin coating, gravure coating, die coating, spraying and the like.

From a viewpoint of regulation of a coating quantity, the spin coating is suitable and a film thickness can be regulated by a rotating speed thereof. In the case in which a continuous base member film is used, the gravure coating, the die coating and the like are suitable. In this case, by causing a solvent to contain the resin and regulating a solid content concentration thereof, it is possible to adjust a coating thickness. As the solvent, for example, it is possible to use toluene, MEK and MEBK. The solid content concentration is regulated into approximately 0.1 wt %, for example.

In the case in which only the depression portion in a part of the Moth-eye film is subjected to the resin embedding and a Moth-eye structure having different heights partially is formed, a method capable of precisely controlling a coating quantity such as an ink jet technique is suitable. The ink jet technique serves to cause ink droplets to fly from a hole (nozzle) formed on an ink reservoir and to cause the ink to reach an adherend. Usually, a head including a plurality of nozzles is caused to carry out scan, and at the same time, the ink droplets are discharged from the nozzles in a desirable position. Consequently, the ink is coated into the desirable position of the adherend. As a method of causing the ink to fly, a piezo method, a thermal method and the like are known. Referring to the piezo method, whether the ink is discharged from each of the nozzles is controlled depending on whether an electric signal for vibrating a piezo element corresponding to the nozzle is input.

According to the inkjet technique in which the Moth-eye film is set to be the adherend and the resin is set to be the ink, it is possible to carry out the resin embedding over only the depression portions in a part of the Moth-eye film. Examples of a configuration for installing an ink jet device include a configuration for installing the ink jet device in a film transfer line and a configuration for performing coating over a film roll which is completely subjected to transfer by the ink jet device.

(5) Example

Figure 19:
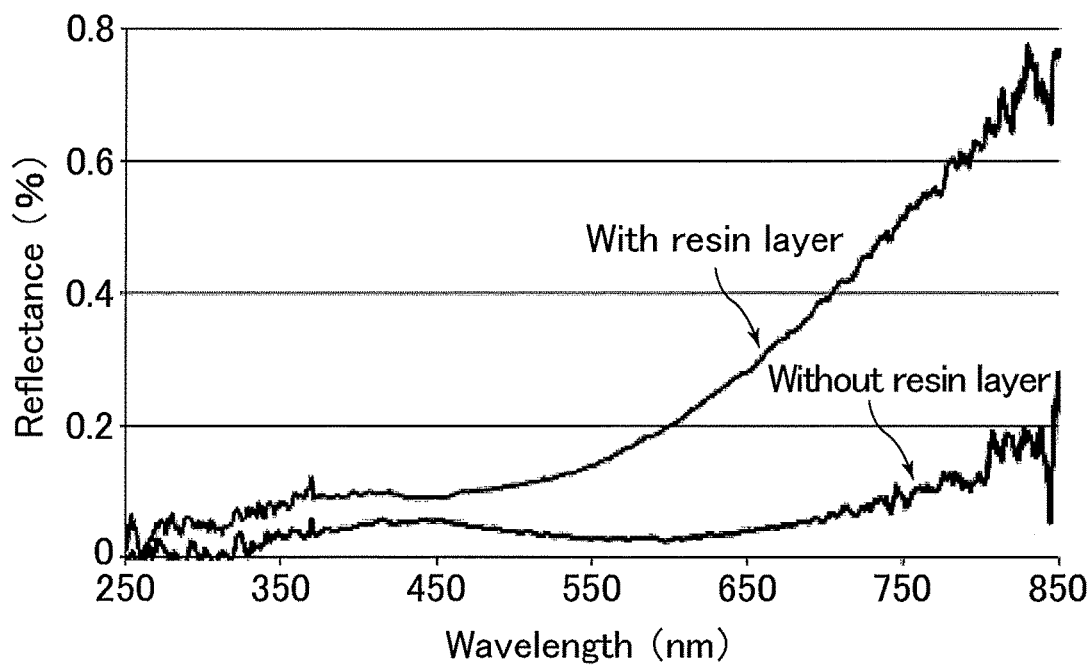
FIG. 19 is a graph showing, for each wavelength (nm), a change in a reflectance (%) depending on presence or absence of a resin layer.

As an example, a Moth-eye film (a resin base member) is coated with a resin. The present example is only illustrative and the present invention is not restricted thereto. A reflectance characteristic indicated as a result of the example in a graph of FIG. 19 is also illustrative as a reflectance characteristic possessed by the antireflection structure according to the present invention. Although the tinge of the reflection color through the Moth-eye structure greatly depends on the height of the protrusion of the Moth-eye structure, it also depends on the shape of the protrusion of the Moth-eye structure to some degree. Accordingly, the reflectance characteristic in the graph of FIG. 19 is not determined uniquely by only the height of the protrusion.

The Moth-eye film is obtained by forming, on a TAC (triacetylcellulose) film, an acrylic-based UV cure resin layer including the Moth-eye structure on a surface. The Moth-eye structure had a pitch between the protrusions of approximately 200 nm and a height of the protrusion of approximately 200 nm. A refractive index of the acrylic-based UV cure resin layer was 1.49.

For a coating resin, CYTOP manufactured by ASAHI GLASS CO., LTD. was used. The resin had a refractive index of 1.32 and a solid content concentration of 0.5 wt %. A dip method was used as the coating method, and pull-up was carried out at a speed of 3 mm/sec after the dipping. After the pull-up, drying was carried out at 60° C. for 30 minutes and burning was performed at 100° C. for one hour.

Figure 15:
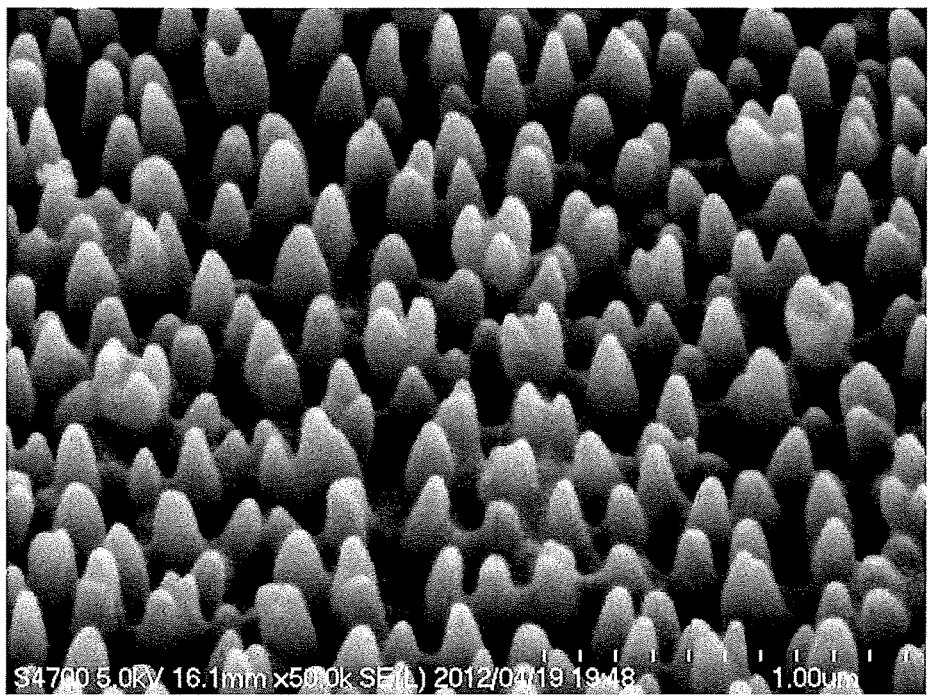
FIG. 15 is a photograph of a surface of a Moth-eye structure before the formation of a resin layer.
Figure 16:
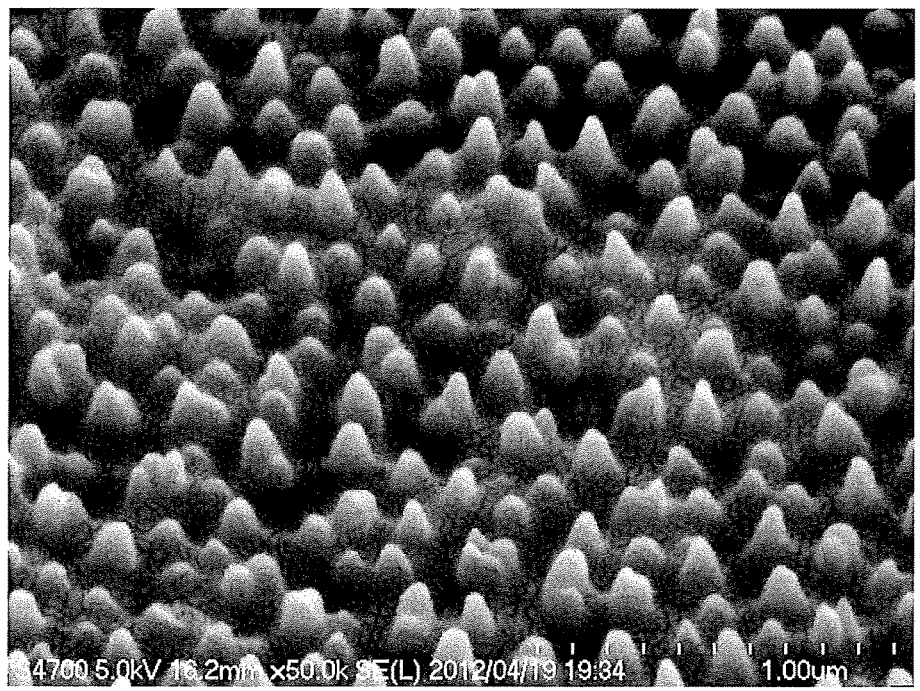
FIG. 16 is a photograph of the surface of a Moth-eye structure after the formation of a resin layer.
Figure 17:
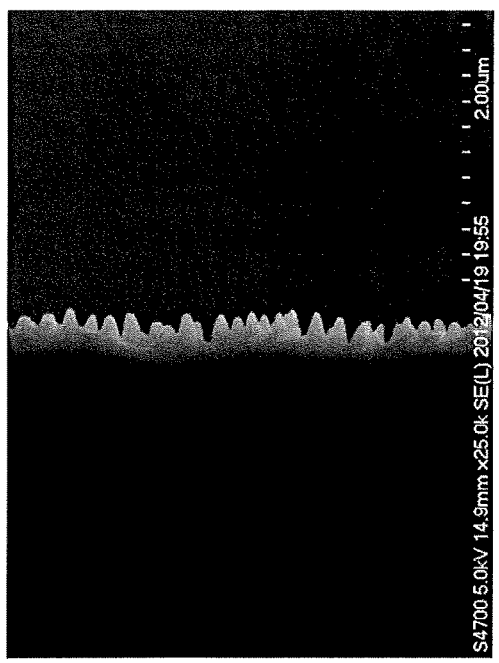
FIG. 17 is a photograph of a section of a Moth-eye structure before the formation of a resin layer.
Figure 18:
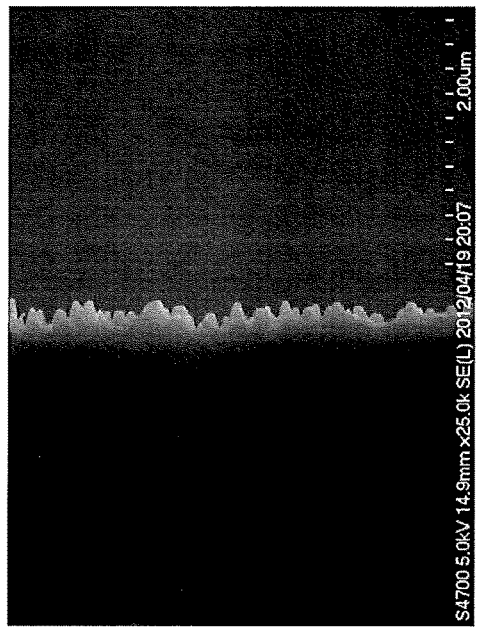
FIG. 18 is a photograph of the section of a Moth-eye structure after the formation of a resin layer.

FIGS. 15 to 18 show results obtained by observing the Moth-eye structures before and after coating a resin by means of a scanning electron microscope (SEM). FIG. 15 is a photograph of a surface of a Moth-eye structure before the formation of a resin layer. FIG. 16 is a photograph of the surface of a Moth-eye structure after the formation of a resin layer (after burning). FIG. 17 is a photograph of a section of a Moth-eye structure before the formation of a resin layer. FIG. 18 is a photograph of the section of a Moth-eye structure after the formation of a resin layer. From FIGS. 16 and 18 after the coating, it is apparent that the depression portion of the Moth-eye structure is filled with the resin up to a height of approximately ¼ to a half of the protrusion of the Moth-eye structure. The apparent height of the protrusion of the Moth-eye structure after the resin embedding was estimated as approximately 100 nm to 150 nm.

FIG. 19 shows a result obtained by measuring a change in an optical characteristic before and after the resin coating. FIG. 19 is a graph showing, for each wavelength (nm), a change in a reflectance (%) depending on presence or absence of a resin layer. The graph of FIG. 19 indicates a result obtained by measuring the reflectance in the case in which light is incident in an inclining direction by 5° from a normal of the surface of the Moth-eye film. Moreover, the measurement was carried out by attaching the Moth-eye film onto a black acrylic substrate having a refractive index of 1.5 with an adhesive having a refractive index of 1.5.

From the graph of FIG. 19, it is apparent that very low reflection is obtained over the whole visible light region before the coating. A regular reflectance with an angle of 5° against a wavelength of 550 nm before the coating was 0.029% and a Y value considering a luminosity factor was 0.033%, and a reflection color was $a^*=0.111$ and $b^*=-0.299$.

On the other hand, a regular reflectance with an angle of 5° against a wavelength of 550 nm after the coating was 0.141% and a Y value was 0.158%, and a reflection color was $a^*=0.857$ and $b^*=0.930$. The reflection characteristic maintained low reflection because the Moth-eye shape was also left after the coating. As is apparent from the values of $a^*$ and $b^*$, however, the tinge was changed in an orange direction from almost neutral (colorless) through the coating. A small chromaticity value is derived from slight reflected light due to the very low reflection characteristic of the Moth-eye structure.

Moreover, fingerprints were given on a surface and were rubbed with a dry cloth (Ben cotton) in the respective states before and after the coating. Consequently, it was difficult to wipe off the fingerprints in the state before the coating, but it was possible to wipe off the fingerprints after the coating.

From the foregoing, the following was found. More specifically, by coating the Moth-eye structure with the resin, it is possible to change the tinge without damaging the low reflection characteristic. Consequently, it is also possible to enhance a wiping property against dirt.

(6) Modified Example

The aforementioned modes of the embodiments may be employed in appropriate combination or modification as long as it is not beyond the spirit of the present invention. For example, the surface shapes of the antireflection structure and the mold for transfer according to the present embodiment are substantially flat except for the uneven portions of the Moth-eye structure. However, it is also possible to provide a scattering uneven structure by previously carrying out sandblasting before the anodization.

(7) Application

The antireflection structure according to the present embodiment can be used for components of a display device (a spontaneous light emission type display element, a non-spontaneous light emission type display element, a light source, a light diffusion sheet, a prism sheet, a polarizing reflection sheet, a phase plate, a polarizing plate, a front face plate, a housing or the like), a lens, a window glass, a frame glass, a show window, a water tank, a printed matter, a photograph, a coated article, an illumination device and the like. Above all, the antireflection structure is suitably used in the display device. The display device is not restricted to a liquid crystal display device (LCD) but can be used for a plasma display panel (PDP), an inorganic electroluminescence (EL) display device, an organic electroluminescence (EL) display device and the like.

REFERENCE SIGNS LIST

10: base member film
11: transfer resin (layer)
12, 12a: resin layer
20: porous alumina layer
21: Al base member
22a: depression portion
31: mold (mold for transfer)
101: monomolecular film

The invention claimed is:

1. An antireflection structure comprising:
   a resin base member including, on a surface, an uneven structure in which a height from a bottom part to a top part is equal to or smaller than 380 nm; and
   a resin layer covering at least a part of the uneven structure,
   wherein
   the antireflection structure includes, in a plane passing through the uneven structure in a direction orthogonal to a height direction of the uneven structure, a first surface region in which the bottom part of the uneven structure of the resin base member is covered with the resin layer and a second surface region in which the bottom part of the uneven structure of the resin base member is not covered with the resin layer and the resin layer in the first surface region covers the bottom part of the uneven structure more thickly than the top part of the uneven structure.

2. The antireflection structure according to claim 1, wherein a height from a bottom part to a top part is 100 nm to 280 nm in an uneven structure of a surface of the antireflection structure which is formed by covering the uneven structure of the resin base member with the resin layer.

3. The antireflection structure according to claim 1, wherein a thickness of the resin layer filled in the bottom part of the uneven structure of the resin base member is equal to or smaller than 280 nm.

4. The antireflection structure according to claim 1, wherein the resin layer is disposed on the bottom part of the uneven structure of the resin base member more thickly by 20 nm to 100 nm than the top part of the uneven structure of the resin base member.

5. The antireflection structure according to claim 1, wherein an uneven structure of a surface of the antireflection structure has a different shape from the uneven structure of the resin base member in a region covered with the resin layer.

6. The antireflection structure according to claim 1, wherein the resin layer is not provided on the top part of the uneven structure of the resin base member.

7. The antireflection structure according to claim 1, wherein a refractive index of a material of the resin layer is lower than a refractive index of a material of the resin base member.

8. The antireflection structure according to claim 1, wherein a material of the resin layer contains a fluorine atom.

9. The antireflection structure according to claim 1, wherein the uneven structure is formed by pushing a mold against a surface of the resin base member to transfer, onto the surface of the resin base member, a shape of a hole which is formed on a surface of the mold by selectively etching a metal oxide film.

10. The antireflection structure according to claim 1, wherein the resin base member is film-shaped.

11. A display device comprising, on a display surface, the antireflection structure according to claim 1.

12. The display device according to claim 11, wherein a region in which the resin layer of the antireflection structure does not cover the uneven structure is disposed in a frame region of the display surface, and a region in which the resin layer of the antireflection structure covers the uneven structure is disposed in a display region of the display surface.

13. The display device according to claim 11, wherein the antireflection structure is attached to the display surface.

14. The display device according to claim 11, wherein the display device is a liquid crystal display device, a plasma display panel or an organic electroluminescence display device.

15. The antireflection structure according to claim 1, wherein the first and second surface regions differ from each other in a tinge of a reflection color.

\* \* \* \* \*